United States Patent
Takahashi

(10) Patent No.: US 8,526,402 B2
(45) Date of Patent: Sep. 3, 2013

(54) RADIO NETWORK CONTROLLER AND TRANSMITTING POWER CONTROL METHOD

(75) Inventor: Mamoru Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 12/636,714

(22) Filed: Dec. 12, 2009

(65) Prior Publication Data

US 2010/0157956 A1    Jun. 24, 2010

(30) Foreign Application Priority Data

Dec. 19, 2008   (JP) .................................. 2008-323349

(51) Int. Cl.
*H04J 3/00*    (2006.01)
(52) U.S. Cl.
USPC .......................................... 370/336; 370/324
(58) Field of Classification Search
USPC ................. 370/324–327, 328–338; 455/427, 455/429
See application file for complete search history.

(56) References Cited

U.S. PATENT DOCUMENTS

| | | | |
|---|---|---|---|
| 6,763,011 | B1 | 7/2004 | Häkkinen |
| 6,934,526 | B2 * | 8/2005 | Choi et al. ..................... 455/403 |
| 2002/0009061 | A1 | 1/2002 | Willenegger |
| 2002/0131379 | A1 * | 9/2002 | Lee et al. ...................... 370/333 |
| 2005/0208961 | A1 | 9/2005 | Willenegger |
| 2007/0178902 | A1 | 8/2007 | Guethaus et al. |

FOREIGN PATENT DOCUMENTS

| | | |
|---|---|---|
| EP | 0955735 A2 | 11/1999 |
| JP | 2001-156708 A | 6/2001 |
| WO | WO-02/065667 | 8/2002 |
| WO | WO 02065667 A1 * | 8/2002 |
| WO | WO 2008/024880 A2 | 2/2008 |

OTHER PUBLICATIONS

TSG-RAN Working Group1 Meeting #, "Fractional dedicated physical channel, discussion on multiplexing options",R1-031073 Oct. 10, 2003, 1-10.
TSG-RAN Working Group 4 (Radio) Meeting #33, "Introduction to Fractional DPCH", R4-040617 (Nov. 15-19, 2004).
"Japanese Office Action" mailed by JPO and corresponding to Japanese application No. 2008-323349 on Oct. 9, 2012, with partial English translation.
Extended European Search Report mailed Mar. 27, 2013 for corresponding European Application No. EP 09 17 8072.6.

(Continued)

*Primary Examiner* — Ricky Ngo
*Assistant Examiner* — Iqbal Zaidi
(74) *Attorney, Agent, or Firm* — Fujitsu Patent Center

(57) ABSTRACT

Radio network controller includes a propagation delay acquisition part for acquiring a measurement value of a round-trip time between the base station device and the radio terminal, an offset acquisition part for acquiring an offset value indicating a delay at which the base station device transmits the information of transmitting power control to the radio terminal, from a reference timing, a channelization format determination part for determining the channel identification spread code transmitted to the base station device based on the measurement value of the round-trip time and the offset value acquired by the offset acquisition part, and a slot format determination part for determining the time slot information transmitted to the base station device based on the measurement value of the round-trip time and the offset value.

8 Claims, 18 Drawing Sheets

(56) References Cited

OTHER PUBLICATIONS

3GPP Organizational Partners, "High Speed Downlink Packet Access (HSDPA) enhancements", 3GPP TR 25.899 V6.1.03, Sep. 2004, pp. 55-64, XP002693422, Retrieved from the Internet: URL:http://www.quintillion.com.jp/3GPP/Specs/25899-610.pdf.

Nortel Networks: "Franctional dedicated physical channel, discussion on multiplexing options", 3GPP TSG-RAN Working Group1 R1-031073, Oct. 6, 2003, pp. 1-10, XP002693423, Retrieved from the Internet: URL:http://www.3gpp.org/ftp/tsg_ran/WG1_RL1/TSGR1_34/Docs/Zips/.

* cited by examiner

FIG. 4

| SLOT FORMAT #i | CHANNEL BIT RATE (kbps) | CHANNEL SYMBOL RATE (ksps) | SF | BITS/SLOT | N_OFF1 BITS/SLOT | N_TPC BITS/SLOT | N_OFF2 BITS/SLOT |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

RADIO NETWORK CONTROLLER AND TRANSMITTING POWER CONTROL METHOD

CROSS-REFERENCE TO RELATED APPLICATION

This application is based upon and claims the benefit of priority of the prior Japanese Patent Application No. 2008-323349, filed on Dec. 19, 2008, the entire contents of which are incorporated herein by reference.

FIELD

The embodiments discussed herein are related to radio network controller and a transmitting power control method. The embodiments may be also applied to a radio network control device and a transmitting power control information setting method for controlling timing setting of transmitting power control information for controlling radio transmitting power of a radio terminal.

BACKGROUND

For example, a W-CDMA (wideband code division multiple access) system (hereinafter, referred to as a W-CDMA system) which is one aspect of a mobile communication system has an inner loop transmitting power control function of controlling the transmitting power on a transmission side corresponding to received quality of a radio signal on a reception side. For example, a base station (described as a Node-B as the case may be) controls the radio transmitting power of a radio terminal on the basis of the received quality of the radio signal from a radio terminal. By using an SIR (signal to interference ratio) measured value as a criterion of evaluation of the received quality, the base station measures the SIR of the radio terminal and compares this SIR measured value with a SIR target value. A result of comparison is mapped over a downlink physical channel signal as an up transmitting power control (TPC) bit value for controlling the transmitting power of an uplink and is transmitted to the radio terminal. In this manner, the inner loop transmitting power control function for the radio terminal is realized. Incidentally, the uplink indicates a direction from the radio terminal to the base station and the downlink indicates a direction from the base station to the radio terminal.

In the W-CDMA system, spread is performed by using two kinds of codes, that is, a channelization code and a scrambling code as channel identification spread codes for identifying channel by using a spread code. Down channelization codes of discrete channels are allocated to users in a one-to-one correspondence. A set channelization code realizes data transfer and power control for a single user. As to the power control, for example, Japanese National Publication of International Patent Application No. 2004-529530 (International Publication Pamphlet No. WO 2002/065667) discloses a technique of performing the power control at a timing in accordance with each propagation delay by transmitting TPC signals to a plurality of radio terminals over a single channel.

On the other hand, an F-DPCH (fractional dedicated physical channel) has been proposed as a discrete channel incidental to an HSDPA (high speed downlink packet access)/EUL (enhanced uplink) channel in the sixth and subsequent releases of the 3GPP (3rd Generation Partnership Project) standard specification (3GPP R1-031073).

The F-DPCH has an advantage that in the case that there is no data to be transferred over a discrete channel, transmission of a TPC bit becomes possible by transmitting only this F-DPCH, thereby making the power control of the uplink possible. The frame of the F-DPCH includes 15 slots. The position of the TPC bit in the slot is determined in accordance with a slot format selected from within 10 slot formats. Thus, it sometimes occurs that the feedback time of the radio transmitting power of a radio terminal is made different in accordance with the position of the TPC bit in the slot having the selected slot format.

As described above, in the W-CDMA system when the F-DPCH is applied, the feedback time of the inner loop transmitting power control is determined in accordance with the position of the TPC bit in the slot in the frame format of the F-DPCH.

SUMMARY

According to an aspect of the embodiment, there is provided a radio network controller being operable to transmit a channel identification spread code and time slot information to a base station device transmitting information of transmitting power control used to control a radio transmitting power of a radio terminal, the radio network controller including a propagation delay acquisition part for acquiring a measurement value of a round-trip time when a signal shuttles between the base station device and the radio terminal, an offset acquisition part for acquiring an offset value indicating a delay of a timing at which the base station device transmits the information of transmitting power control to the radio terminal, from a reference timing, a channelization format determination part for determining the channel identification spreading code transmitted to the base station device based on the measurement value of the round-trip time acquired by the propagation delay acquisition part and the offset value acquired by the offset acquisition part, and a slot format determination part for determining the time slot information transmitted to the base station device based on the measurement value of the round-trip time acquired by the propagation delay acquisition part and the offset value acquired by the offset acquisition part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of bit allocation to each field in each slot format of the F-DPCH;

DESCRIPTION OF EMBODIMENTS

Figure 1:
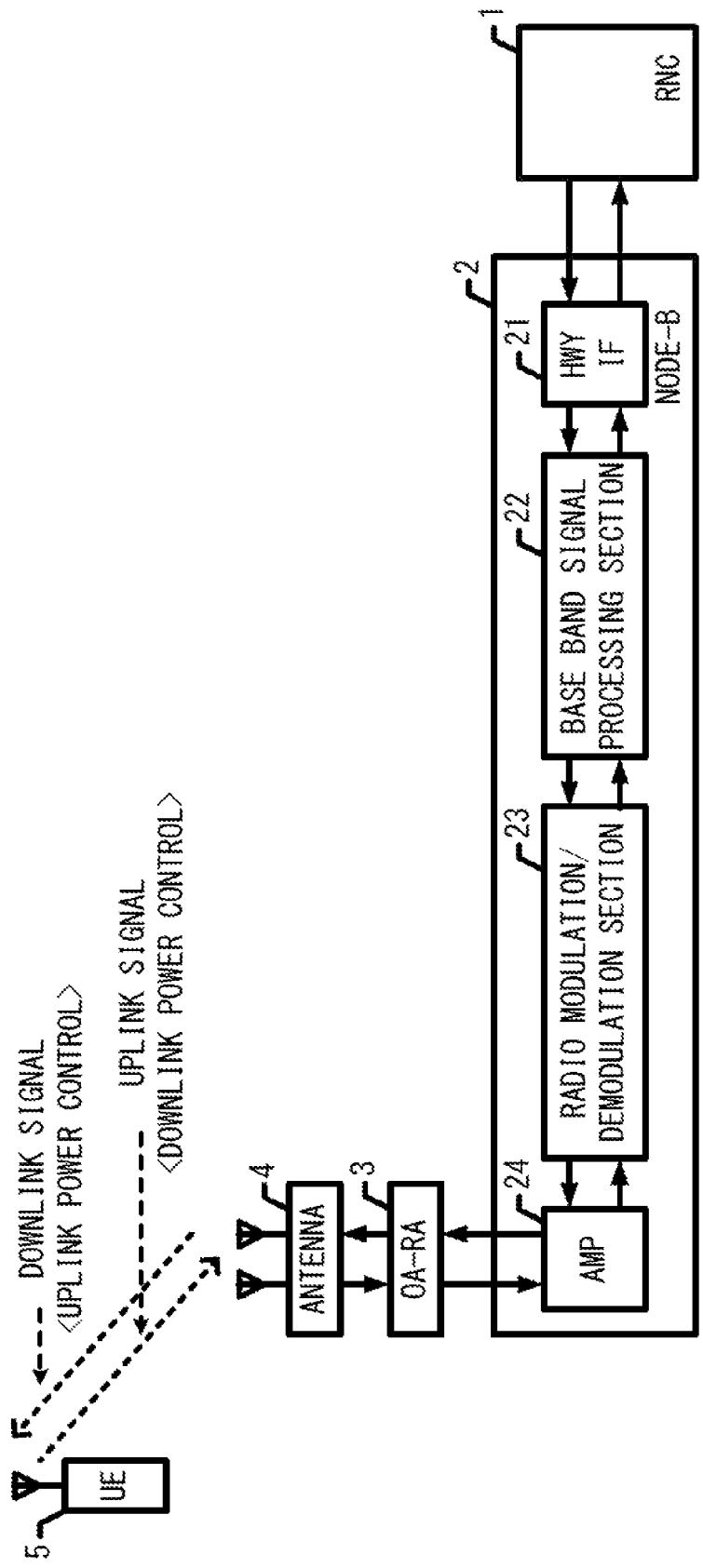
FIG. 1 is a block diagram illustrating an example of a mobile communication system.

Embodiments will be described in detail with reference to the accompanying drawings hereinbelow. Incidentally, in the drawings, the same reference numerals or signs are assigned to the same or similar parts.

First Embodiment

FIG. 1 is a diagram illustrating an example of a mobile communication system. A reference numeral 1 is a radio network controller (RNC), 2 is a radio base station (Node-B), 3 is an open air receiver amplifier (OA-RA), 4 is an antenna and 5 is a radio terminal (hereinafter, described as UE: user equipment). A downlink signal which has been transmitted from the RNC 1 is received by a transmission path interface section (HWYIF) 21 of the Node-B 2. A control signal is added to the received downlink signal by using a base band signal processing section 22 and then the received downlink signal is encoded and spread. The spread downlink signal is modulated by using a radio modulation/demodulation section 23, is amplified by using an amplifying section (AMP) 24 and is transmitted to the UE 5 via the OA-RA 3 and the antenna 4. Incidentally, uplink power control information for controlling the transmitting power of the UE 5 is included in the downlink signal transmitted to the UE 5. Downlink power control information for controlling the transmitting power of the Node-B 2 is included in an uplink signal which has been transmitted from the UE 5. This uplink signal is received by the Node-B 2 via the antenna 4 and the OA-RA 3. The received uplink signal is amplified by using the AMP 24 and is demodulated by using the radio modulation/demodulation section 23. The demodulated uplink signal is inversely spread (hereinafter, described as despread) and decoded by using the base band signal processing section 22 and is transmitted to the RNC 1 via the HWYIF 21. Incidentally, the up power control information included in the downlink signal from the UE 5 is extracted by using the base band signal processing section 22. Here, the uplink indicates a direction from the UE 5 to the Node-B 2 and the downlink indicates a direction from the Node-B 2 to the UE 5.

Figure 2:
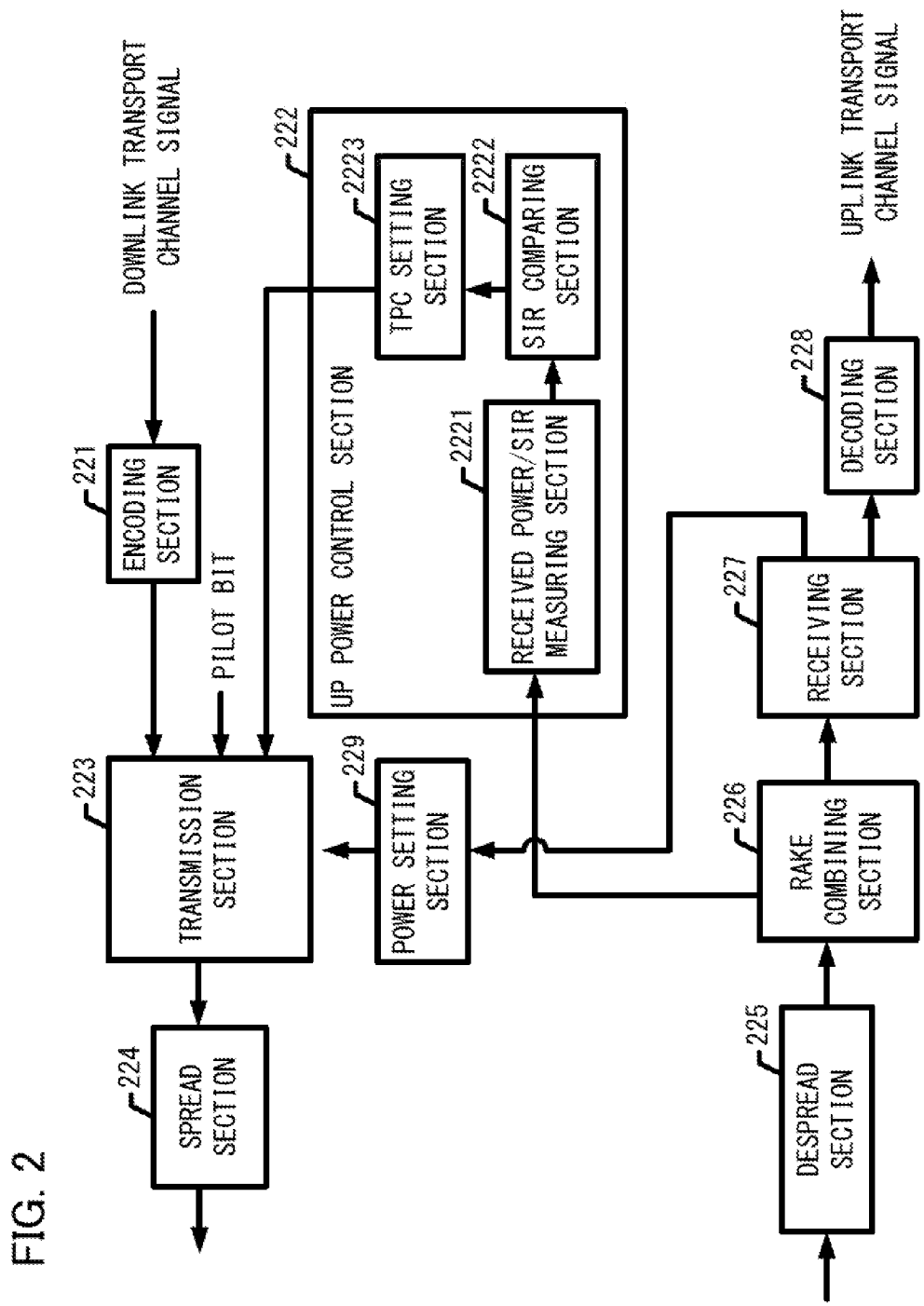
FIG. 2 is a diagram illustrating an outline of a base band signal processing section of a Node-B.

FIG. 2 is a diagram illustrating an outline of the base band signal processing section 22 of the Node-B 2. An encoding section 221 performs an encoding process on a transport channel signal of the downlink which has been received from the RNC 1 via the HWYIF 21. That is, the encoding section 221 encodes the transport channel signal of the downlink. An up power control section 222 generates downlink control information including a TPC bit for controlling the transmitting power of the UE 5. A transmission section 223 generates a downlink signal including the encoded down transport channel signal, a pilot bit and a downlink physical channel signal having control information generated by using the up power control section 222. The downlink signal is transmitted on the basis of the transmitting power set by using a power setting section 229. A spreading section 224 performs a spreading process on the downlink signal. An despreading section 225 performs an inversely spreading (despreading) process on the uplink signal received from the UE 5 to detect a pilot symbol. An RAKE combining section 226 performs channel estimation using the detected pilot symbol so as to RAKE-combine a signal over each multipath. A receiving section 227 extracts the control information from a RAKE-combined uplink signal to generate a transport channel signal of the uplink. A decoding section 228 decodes the transport channel signal of the uplink from the receiving section 227 and transfers it to the RNC 1 via the HWYIF 21. A power setting section 229 sets the transmitting power of the downlink signal on the basis of down power control information included in the control information which has been extracted by using the receiving section 227. Incidentally, in the up power control section 222, a received power/SIR measuring section 2221 measures a received power and an SIR value of a pilot symbol part in a discrete channel concerned with a pilot signal which has been RAKE-combined by using the RAKE combining section 226. An SIR comparing section 2222 compares the received SIR measured value with a received SIR target value. A TPC setting section 2223 maps a result of comparison from the SIR comparing section 2222 over the downlink physical channel signal as an up TPC bit.

As described above, inner loop transmitting power control is performed on the transmitting power of the UE 5 by controlling the transmitting power of the UE 5 with the TPC bit which has been mapped over the downlink physical channel signal generated by using the up power control section 222.

Figure 3:
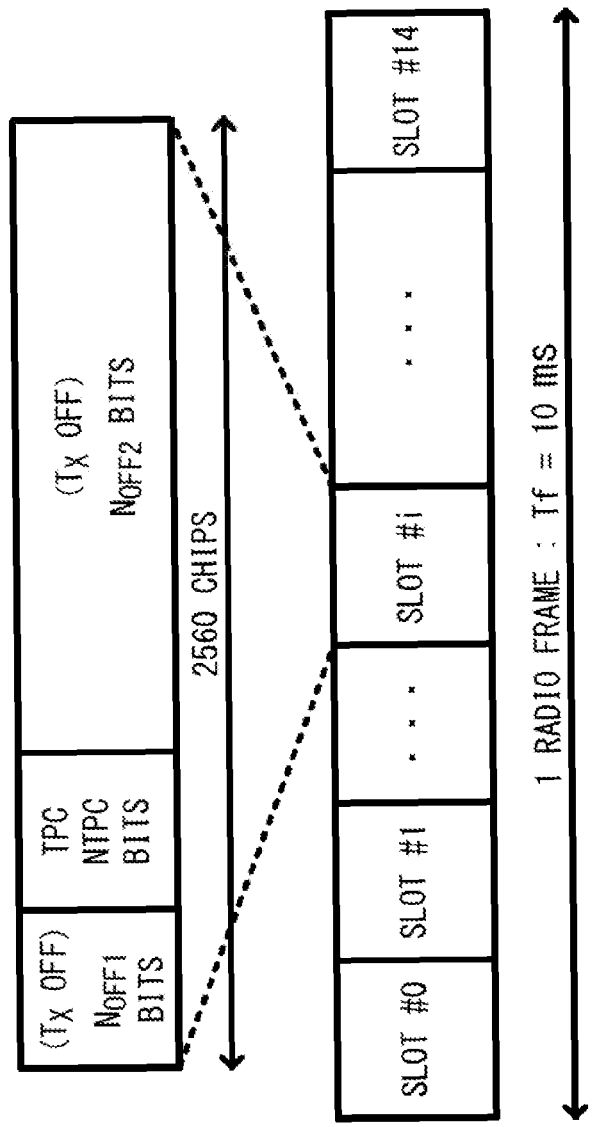
FIG. 3 is a diagram illustrating an example of a frame format of an F-DPCH.

FIG. 3 is a diagram illustrating an example of a frame format of the F-DPCH. FIG. 4 is a diagram illustrating an example of bit allocation to each field in each slot format of the F-DPCH. A frame cycle is 10 ms and one frame has 15 slots SLOT#0 to SLOT#14. Each slot has a width of 2560 chips, only the 2-bit TPC bit (256 chips in width) is transmitted and bits other than the TPC bit are held in transmission OFF states. In the seventh and subsequent releases of the 3GPP standard specification, for example, 10 kinds of slot formats illustrated in FIG. 4 are defined as the slot formats of the F-DPCH. That is, 10 kinds of locations are defined as the location of the TPC bit in a slot. The location of the TPC bit is adjusted in accordance with a non-signal bit length $N_{OFF1}$ before the TPC bit in each slot and a non-signal bit length $N_{OFF2}$ after the TPC bit. Therefore, in the case that, in channels of a plurality of users to which the F-DPCH is applied, each channel does not superpose on the position of the TPC bit to be output to a downlink signal, it becomes possible to transmit these channels using the same channelization code and hence the number of codes is reduced. Incidentally, $N_{OFF1}$ is correspond to an offset value indicative of a delay of a timing at which the Node-B 2 transmits the TPC bit to the UE 5 from a reference timing.

Figure 5:
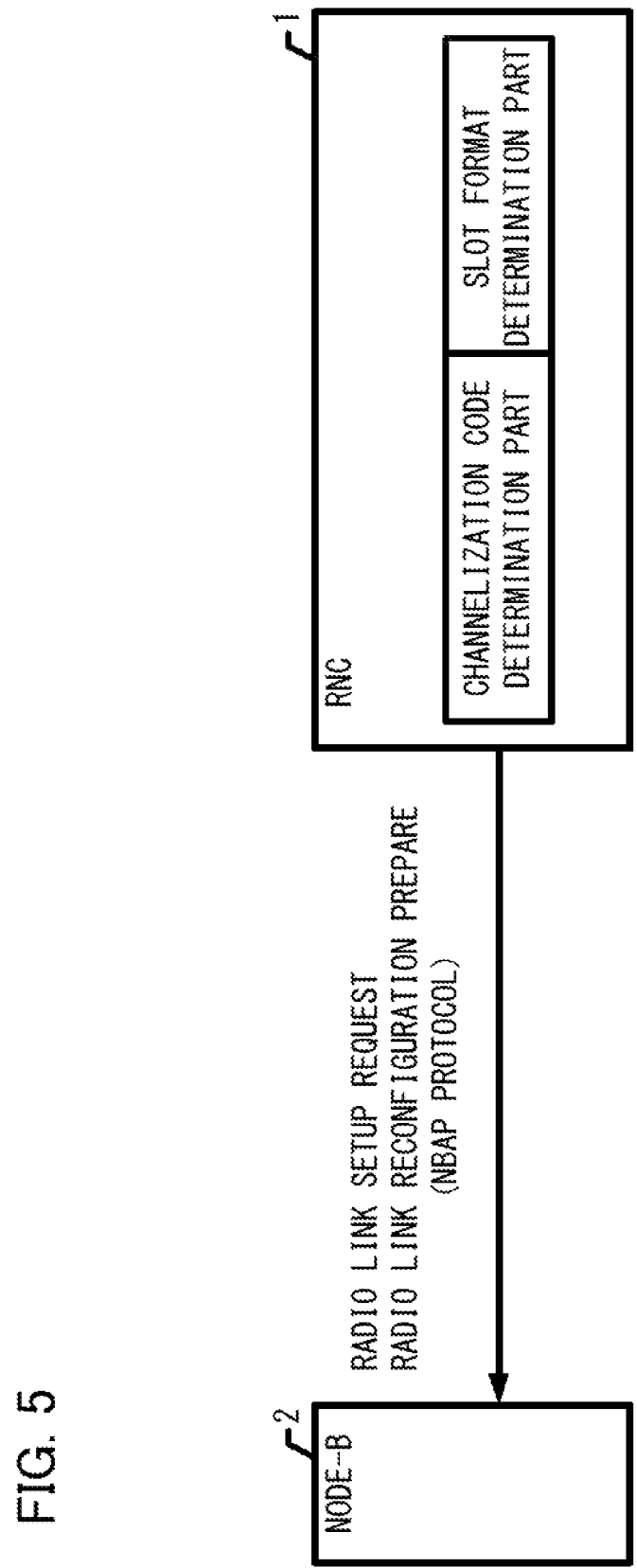
FIG. 5 is a diagram illustrating notification of parameters of the F-DPCH.

FIG. 5 is a diagram illustrating notification of parameters of the F-DPCH. The RNC 1 notifies the Node-B 2 of the slot format of the F-DPCH and a set value of its channelization code using a radio link setup request signal used for setting of the discrete channel or a radio link reconfiguration prepare signal used for updating of the discrete channel in accordance with the NBAP (Node-B application part) protocol.

Figure 6:
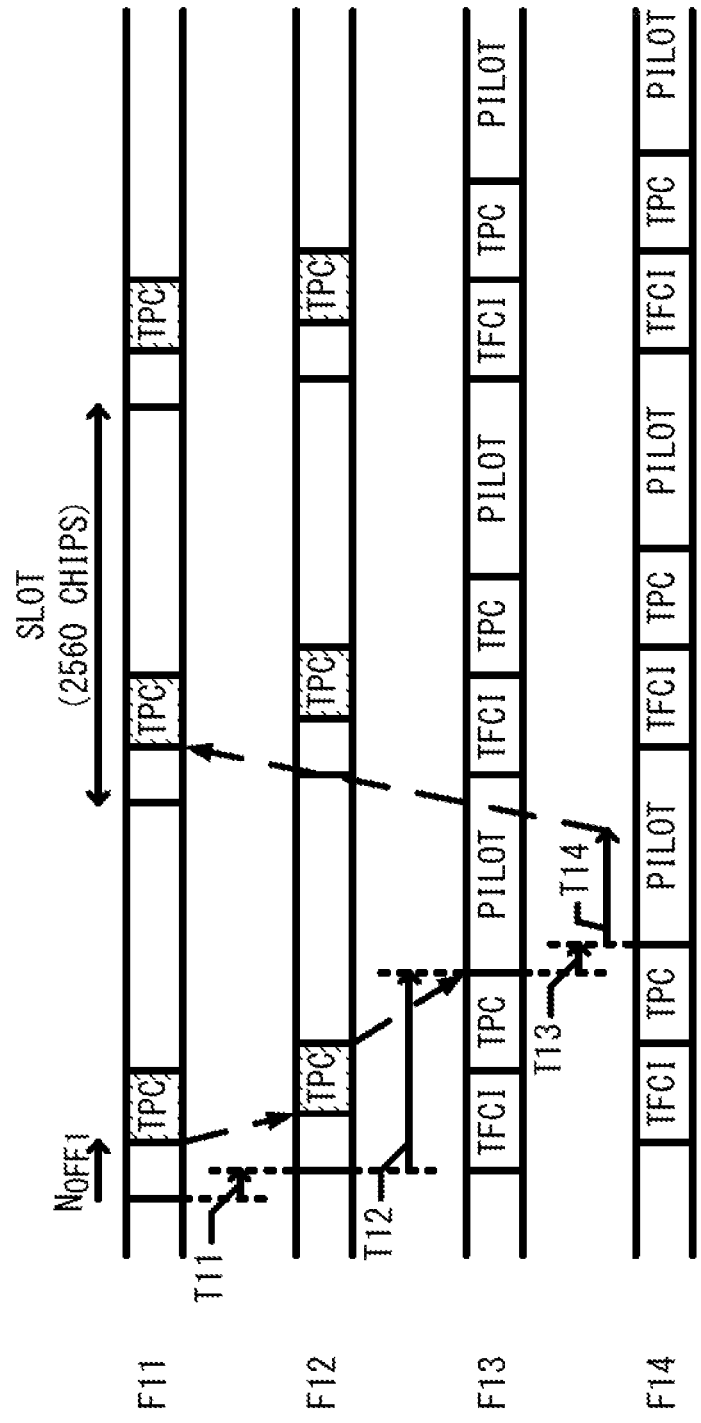
FIG. 6 is a diagram illustrating an example of process timings of radio terminal transmitting power control (up power control) when the F-DPCH is applied.
Figure 7:
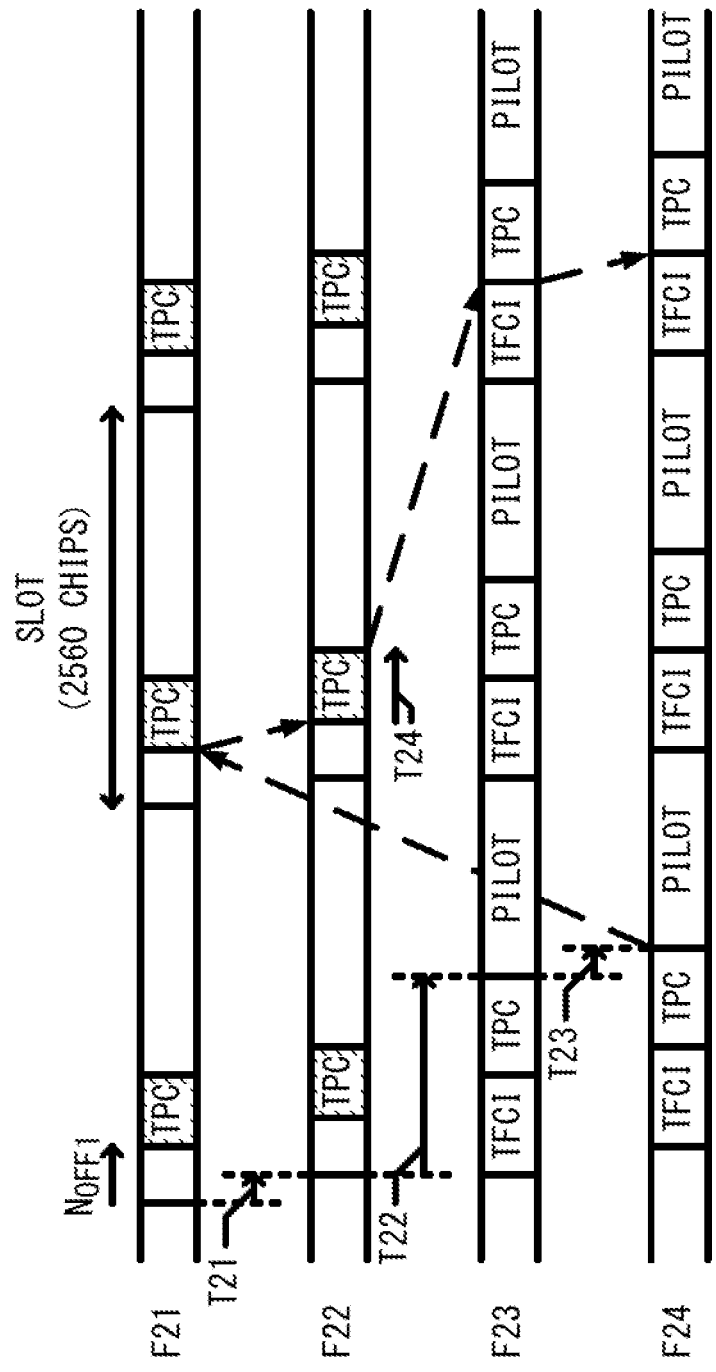
FIG. 7 is a diagram illustrating an example of process timings of Node-B transmitting power control (down power control) when the F-DPCH is applied.

FIG. 6 is a diagram illustrating an example of process timings of radio terminal transmitting power control (up power control) when the F-DPCH is applied. FIG. 7 is a diagram illustrating an example of process timings of Node-B transmitting power control (down power control) when the F-DPCH is applied. F11 and F21 denote timings at which a downlink signal is transmitted from the Node-B 2, F12 and F22 denote timings at which the downlink signal is received by the UE 5, F13 and F23 denote timings at which an uplink signal is transmitted from the UE 5 over a UL-DPCCH (uplink-dedicated physical data channel) and F14 and F24 denote timings at which the uplink signal is received by the Node-B 2 over the UL-DPCCH.

In addition, FIG. 6 and FIG. 7 illustrate respective process timings of up power control and down power control in the case that the slot format #0 ($N_{OFF1}$=2 bits) and the slot format #9 ($N_{OFF1}$=0 bits) illustrated in FIG. 4 are applied. Here, in the case that the reflected time of the up power control using the TPC bit on the F-DPCH is made realizable by a delay of 1 slot (1-slot delay), conditions of the propagation delayed amount PDi (chip) designated by T11 and T13 will be as follows from FIG. 6.

$$PDi<(1536+N_{OFF1}\times 128-M)/2 \text{(chips)} \quad \text{(Formula 1)}$$

Here, in FIG. 6, T12 is an offset timing of a transmitted signal (the uplink signal) from a received signal (the downlink signal) in the UE 5 and 1024 chips are allocated thereto. T14 is M (chip) in Formula 1 and the Node-B 2 measures the received SIR after reception of the pilot bit of the UL-DPCCH has been started and judges the down TPC bit in accordance with comparison of the SIR measured value with the SIR target value. T14 is a time required until a result of judgment is mapped as the TPC bit on the F-DPCH and has a value inherent to each device.

Thus, conditions of the propagation delayed amount PDi which makes 1-slot delay processing of the up power control possible will be as follows.

For the slot format #9: $PDi<(768-M/2)$(chips); and

For the slot format #0: $PDi<(896-M/2)$(chips) (Formulae 2)

Incidentally, slot formats which make 1-slot delay processing of the up power control possible are only the slot formats #9 and #0. According to Formulae 2, the range of PDi in the slot format #0 is wider and covers the range of PDi in the slot format #9. Therefore, the slot format #0 is higher in degree of freedom to a fluctuation in propagation delayed amount than the slot format #9.

In addition, in the case that the slot formats #1 to #8 are applied, the 1-slot delay processing of the up power control is difficult and hence a delay of 2 slots (2-slot delay) is needed at a minimum.

Figure 8:
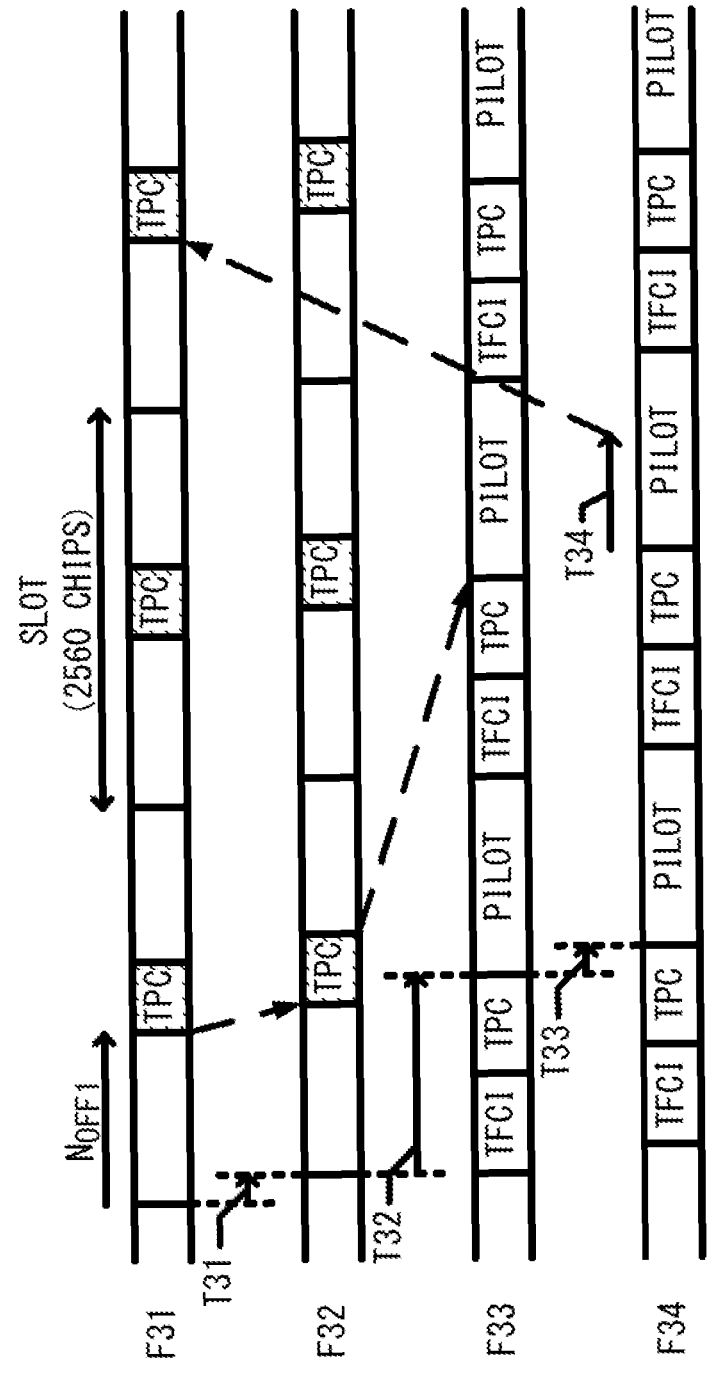
FIG. 8 is a diagram illustrating an example of process timings of radio terminal transmitting power control (up power control) when the F-DPCH is applied in the case that slot formats #1 to #8 are applied.
Figure 9:
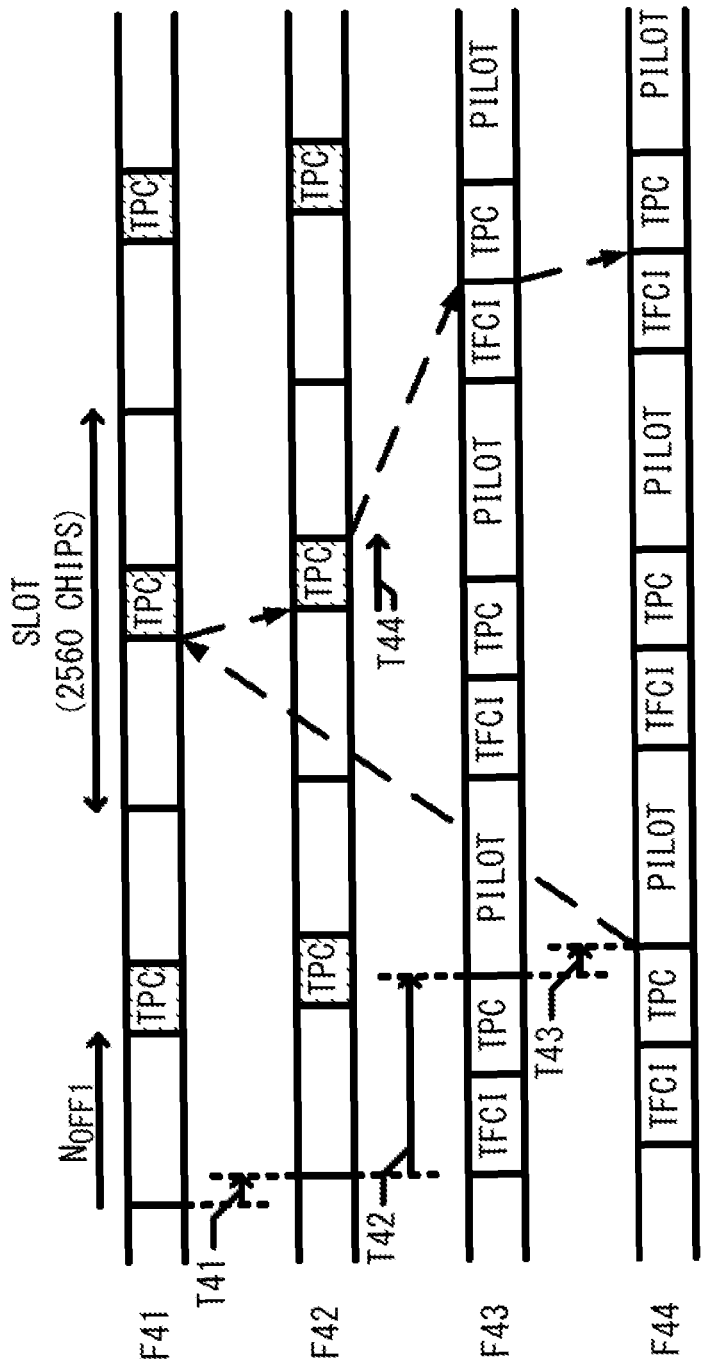
FIG. 9 is a diagram illustrating an example of process timings of Node-B transmitting power control (down power control) when the F-DPCH is applied.

FIG. 8 is a diagram illustrating an example of process timings of transmitting power control (up power control) of the radio terminal when the F-DPCH is applied in the case that the slot formats #1 to #8 are applied. FIG. 9 is a diagram illustrating an example of process timings of transmitting power control (down power control) of the Node-B when the F-DPCH is applied. F31 and F41 denote timings at which a downlink signal is transmitted from the Node-B 2, F32 and F42 denote timings at which the downlink signal is received by the UE 5, F33 and F43 denote timings at which an uplink signal is transmitted from the UE 5 over the UL-DPCCH and F34 and F44 denote timings at which the uplink signal is received by the Node-B 2 over the UL-DPCCH.

As in the case illustrated in FIG. 6, in FIG. 8, in the case that the reflected time of the up power control by the TPC bit on the F-DPCH is made realizable by a 2-slot delay, conditions of the propagation delayed amount PDi (chip) designated by T31 and T33 will be as follows.

For the slot format #9: $(768-M/2)\leq PDi<(2048-M/2)$ (chips);

For the slot format #0: $(896-M/2)\leq PDi<(2176-M/2)$ (chips);

For the slot format #1: $PDi<(1024-M/2)$(chips);

For the slot format #2: $PDi<(1152-M/2)$(chips);

For the slot format #3: $PDi<(1280-M/2)$(chips);

For the slot format #4: $PDi<(1408-M/2)$(chips);

For the slot format #5: $PDi<(1536-M/2)$(chips);

For the slot format #6: $PDi<(1664-M/2)$(chips);

For the slot format #7: $PDi<(1792-M/2)$(chips); and

For the slot format #8: $PDi<(1920-M/2)$(chips) (Formulae 3)

As described above, in the case that the F-DPCH has been applied, the range of the propagation delayed amount PD within which a 1-slot delay or 2-slot delay processing of the up power control is made possible is determined for each slot format. According to Formulae 3, the range of PDi in the slot format #0 is wider and covers the ranges of PDi in the slot formats #1 to #9. Therefore, the slot format #0 is higher in degree of freedom to the fluctuation in propagation delayed amount than the slot formats #1 to #9.

As described above, in the case that the propagation delayed amount is within the range of Formulae 2 and the slot format #9 or #0 is applied, the up power control by a 1-slot delay becomes possible as illustrated in FIG. 6. In the case that any one of the slot formats #1 to #8 is applied, the up power control by a 2-slot delay is made as illustrated in FIG. 8.

Figure 10:
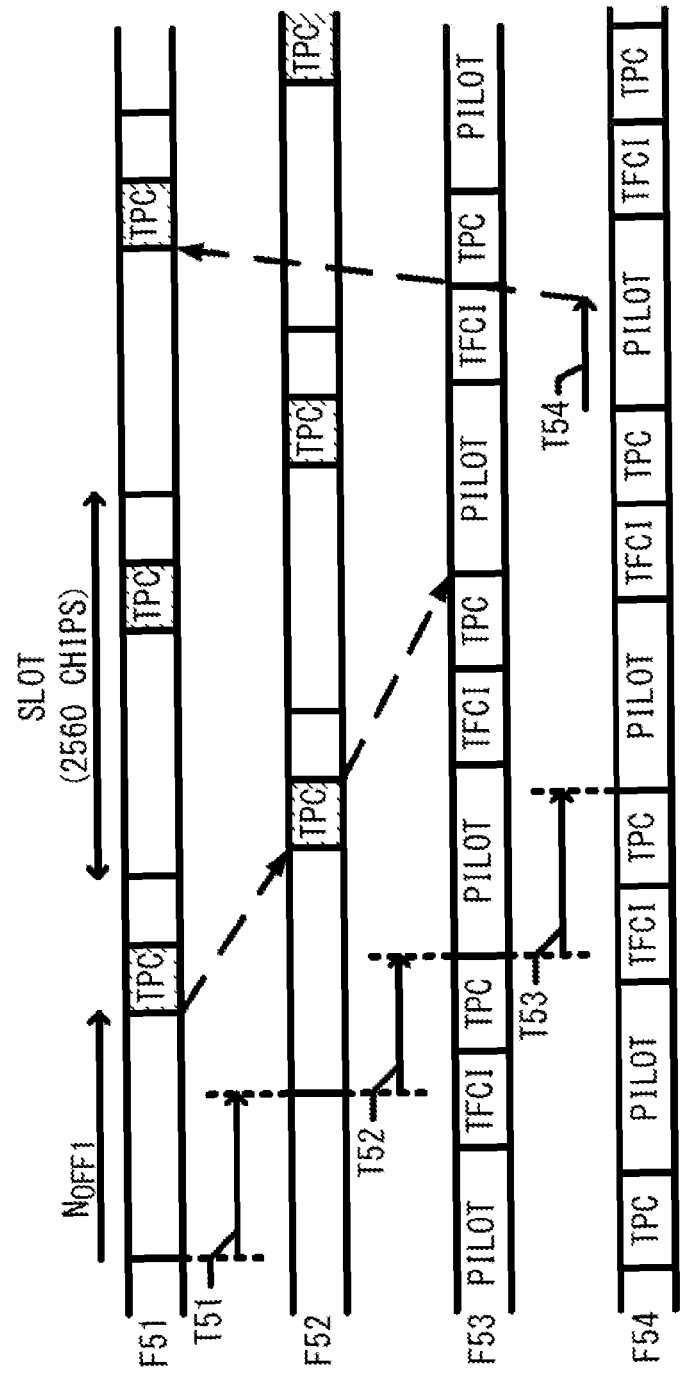
FIG. 10 is a diagram illustrating an example of process timings of radio terminal transmitting power control (up power control) when the F-DPCH is applied.

In addition, in the case that the propagation delayed amount exceeds the range of Formulae 2 and a slot format conforming to the conditions of Formulae 3 has been applied, the up power control by the 2-slot delay becomes possible as illustrated in FIG. 10. However, in the case that a slot format which does not conform to the conditions of Formulae 3 has been applied, the up power control by a 3-slot delay is made as illustrated in FIG. 11.

Figure 11:
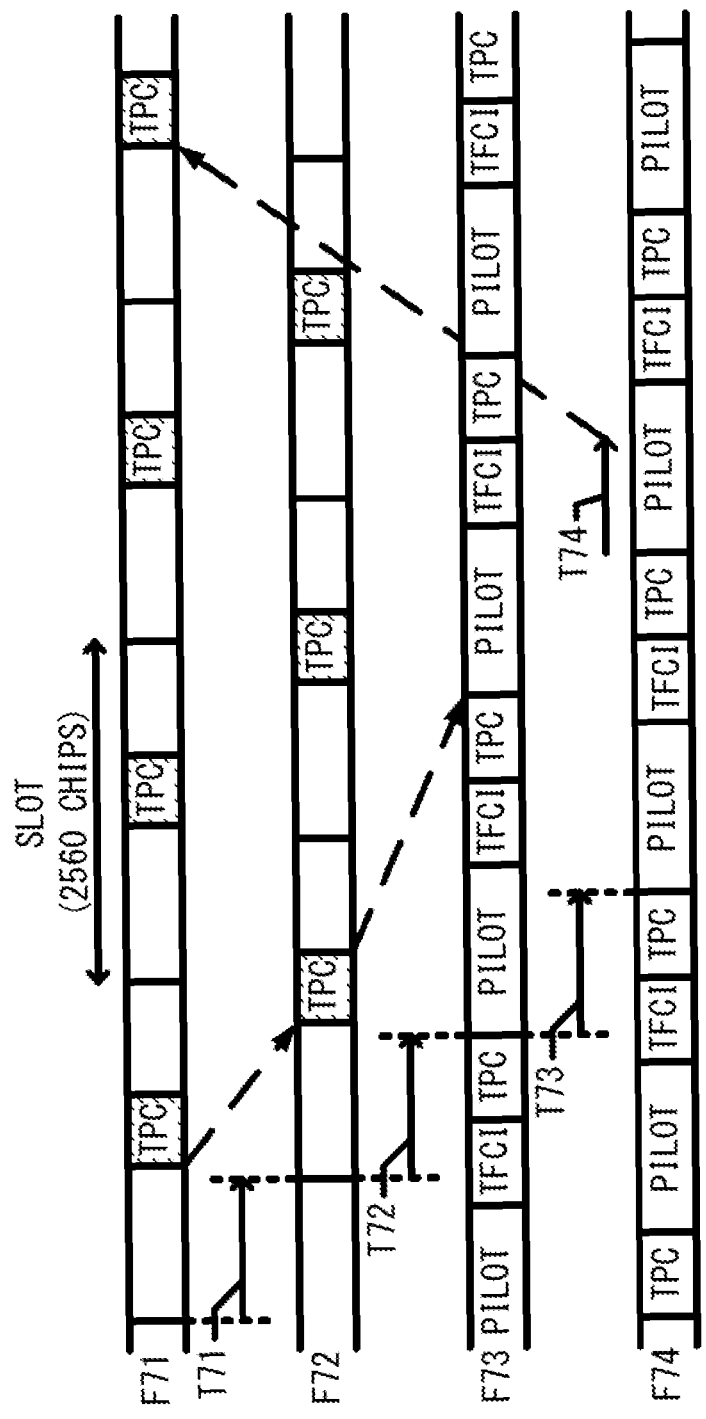
FIG. 11 is a diagram illustrating an example of process timings of a radio terminal transmitting power control (up power control) when the F-DPCH is applied.

Incidentally, FIG. 10 and FIG. 11 illustrate examples of process timings of the radio terminal transmitting power control when the F-DPCH is applied as in the cases illustrated in FIG. 6 and FIG. 8. FIG. 10 and FIG. 11 illustrates the process timings in the case that the propagation delayed amount is so large as to exceed a range within which the up power control is processed by the 1-slot delay. FIG. 10 illustrates a case in which optimum F-DPCH format allocation has been performed and FIG. 11 illustrates a case in which optimum F-DPCH format allocation has not been performed. Thus, in determination of the slot format of the F-DPCH, it is desirable to allocate the slot format #9 or #0 to a channel which makes processing possible by the 1-slot delay, considering the propagation delayed amount of a user channel of interest. In addition, slot format allocation which considers the propagation delayed amount is desirable when processing by the 2-slot delay is performed.

Next, optimization of a TPC bit output timing in order to reduce the feedback time of radio terminal transmitting power control (up power control) will be studied.

First, allocation of a channelization code and a slot format to be set when the F-DPCH is applied to the channel of a user #i will be described. A transmission timing offset τi from the criterion of a primary common pilot channel (PCPICH) which is usually sent out from the Node-b and is used as a channel phase reference signal with which informative information is transmitted is set in the discrete channel of the user #i.

$$\tau i = COi \times 256 \text{(chips)} \quad \text{(Formula 4)}$$

(Incidentally, COi: any one of integers 0 to 149)

In a mobile communication system to which the F-DPCH is applied, it is assumed that N channelization codes (Code#0, Code#1, Code#2, ... Code#(N−1)) to be allocated to the F-DPCH are ensured.

In addition, it is also assumed that the following function (Formula 5) is defined in an operation cell and is set at "0" as its initial state.

$$FDP(c, t) = 0 \quad \text{(Formula 5)}$$

(Incidentally, c=0, 1, 2, ... N−1, t=0, 1, 2, ... 9)

In the function in Formula 5, c indicates a channelization code identification number. The function in Formula 5 is a function to indicate whether F-DPCH of the TPC output timing t of Code #c is currently set, and "0" indicates that it is not yet set and "1" indicates that it has been already set. The TPC output timing t is a value depending on the chip offset value of the F-DPCH and its slot format and is indicated as follows.

$$t = (COi + N_{OFF1}/2) \bmod 10 \quad \text{(Formula 6)}$$

Formula 6 indicates a TPC output timing from the reference timing of the PCPICH.

Figure 12:
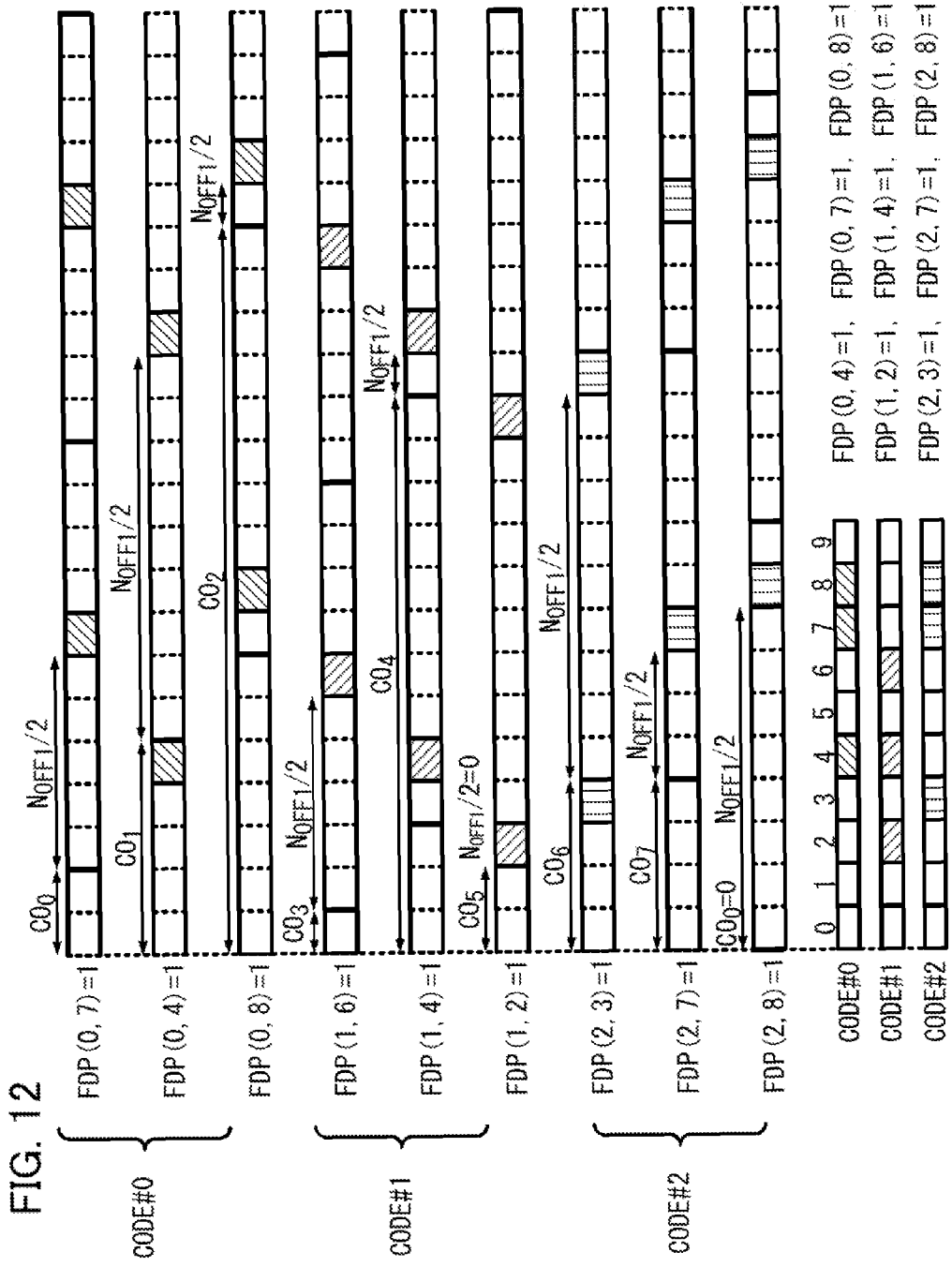
FIG. 12 is a diagram illustrating an example of a situation that respective channelization codes and TPC timings are used when the F-DPCH is applied.

FIG. 12 is a diagram illustrating an example of a situation that respective channelization codes and TPC timings are used when the F-DPCH is applied. Incidentally, since no TPC bit is set to the F-DPCH in its initial state, FDP (c, t)=0. FIG. 12 illustrates an example of a state in which the TPC bit is set. For example, FDP (0, 7)=1 indicates that the channelization code CODE#0 and a TPC timing indicated by the slot format #4 of $N_{OFF1}$=10 illustrated in FIG. 4 are set.

Figure 13:
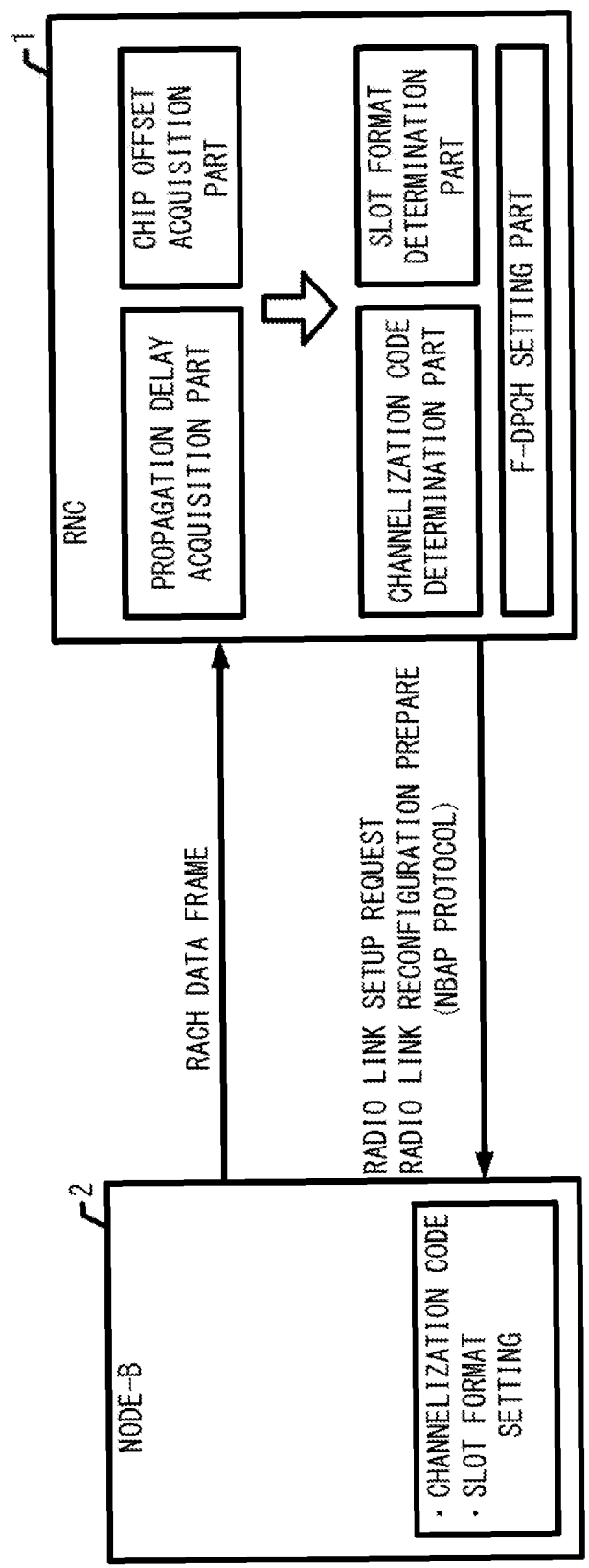
FIG. 13 is a diagram illustrating setting of a channelization code and a slot format in an RNC.

FIG. 13 is a diagram illustrating setting of channelization codes and slot formats in the RNC 1. The RNC 1 acquires a round trip time obtained by measuring a time taken for data that the Node-B 2 notifies the RNC 1 using a random access channel (RACH) data frame or the like and the Node-B 2 has transmitted to make a round trip via the UE 5 and determines to which one of the following equations the propagation delayed amount (PDi) corresponds. The RNC 1 also acquires a chip offset value τi which is set using the Node-B 2.

For $0 \leq PDi < (768-M/2)$: $Di=0$;

For $(768-M/2) \leq PDi < (896-M/2)$: $Di=1$;

For $(896-M/2) \leq PDi < (1024-M/2)$: $Di=2$;

For $(1024-M/2) \leq PDi < (1152-M/2)$: $Di=3$;

For $(1152-M/2) \leq PDi < (1280-M/2)$: $Di=4$;

For $(1280-M/2) \leq PDi < (1408-M/2)$: $Di=5$;

For $(1408-M/2) \leq PDi < (1536-M/2)$: $Di=6$;

For $(1536-M/2) \leq PDi < (1664-M/2)$: $Di=7$;

For $(1664-M/2) \leq PDi < (1792-M/2)$: $Di=8$; and

For $(1792-M/2) \leq PDi < (1920-M/2)$: $Di=9$ (Formulae 7)

For example, in FIG. 6, the round trip time measured using the Node-B 2 is a time taken from the timings F11 to F14, that is, T11+T12+T13. Thus, PDi indicated by T11 and T13 is derived and Di is determined from Formulae 7. Incidentally, M (chip) used in Formulae 7 corresponds to a time required from when the Node-B 2 has started reception of the pilot bit of the UL-DPCCH to when the received SIR is measured, the measured value of the SIR is compared with the SIR target value to judge the down TPC bit and a result of judgment is mapped as the TPC bit of the F-DPCH. M is a value inherent to each device and is information that the RNC 1 recognizes.

In addition, the chip offset value τi that the Node-B 2 recognizes is acquired, by which COi is determined from Formula 4.

The channelization code and the slot format of the F-DPCH to be set are determined on the basis of these Di and COi. This determining method will be described later with reference to FIG. 14 and FIG. 15. The RNC 1 notifies the Node-B 2 of the determined channelization code and slot format using the radio link setup request signal upon setting of the discrete channel or the radio link reconfiguration prepare signal upon updating in accordance with the NBAP (Node-B application part) protocol.

Figure 14:
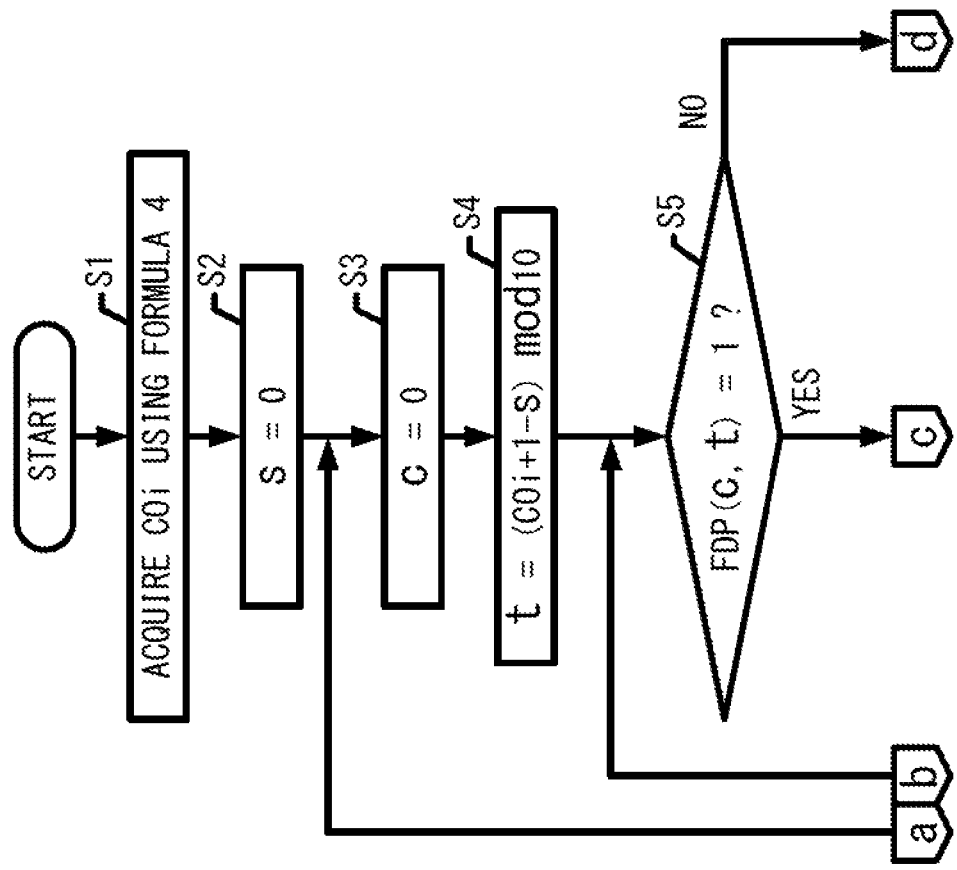
FIG. 14 is a flowchart illustrating an example of a channelization code and slot format determining method when the F-DPCH is applied.
Figure 15:
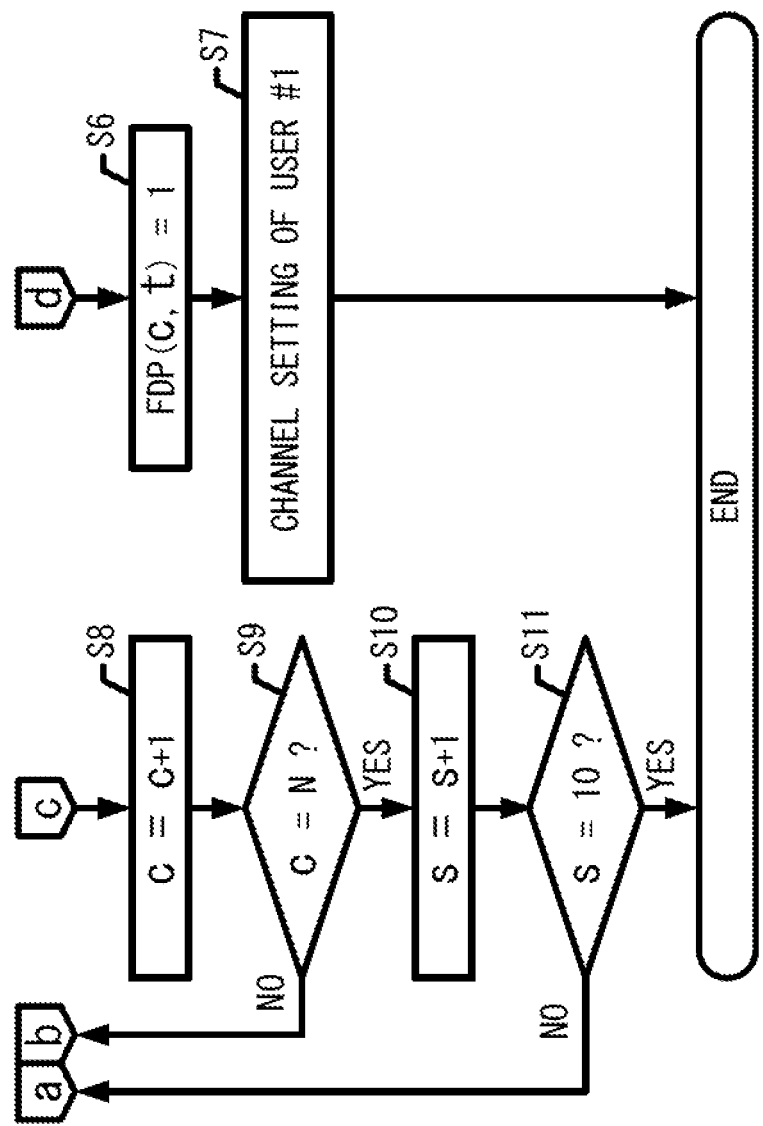
FIG. 15 is a flowchart illustrating an example of a channelization code and slot format determining method when the F-DPCH is applied.

FIG. 14 and FIG. 15 are flowcharts illustrating an example of a channelization code and slot format determining method when the F-DPCH is applied.

S1: The chip offset value Ti reported from the Node-B 2 is acquired to derive COi using Formula 4. The derived COi is stored in data storage medium such as a memory or the like.

S2: A parameter s is set to "0". The parameter s corresponds to the frequency of retrieving the slot format of the F-DPCH.

S3: A parameter c is set to "0". The parameter c corresponds to the channelization code identification number.

S4: The remainder (mod 10) of division of t=(COi+1−s) by 10 is obtained using COi derived at step S1 and the parameter set at step S2. Incidentally, this formula is equivalent to Formula 6. That is, (1−s) mod 10 is equal to $N_{OFF1}/2$ and is set as a timing of the slot format #0 ($N_{OFF1}/2=1$) upon execution of the first loop processing (s=0) at steps S3 to S11. It is set as a timing of the slot format #9 ($N_{OFF1}/2=0$) upon execution of the second loop processing (s=1), as a timing of the slot format #8 ($N_{OFF1}/2=9$) upon execution of the third loop processing (s=2) and as a timing of the slot format #1 ($N_{OFF1}/2=2$) upon execution of the final tenth loop processing (s=9). In this processing, the reason why the slot format #0 is preferentially retrieved lies in that as described above, it has a wide range of the allowable propagation delayed amount within which 1-slot delay processing and 2-slot delay processing of the up power control are made possible. The subsequent slot formats are retrieved in the other that a slot format having a wider range of the allowable propagation delayed amount obtained in Formulae 2 and Formulae 3 comes earlier than others.

S5: Whether the function FDP (c, t) constituted by the parameter c for identifying a channelization code and t obtained at step S4 is "1" is judged. That is, whether there currently exists an F-DPCH set so as to spread the TPC bit set at the timing t with the channelization code #c is judged. "1" indicates the presence of the F-DPCH. "0" indicates its absence.

S6: In the case that FDP (c, t)=0 at step S5, FDP (c, t) at step S5 is set to "1". That is, FDP (c, t) at step S5 is not yet used, so that it is useful for a user concerned.

S7: Channel setting of the user concerned #i is processed. That is, Code #c is selected as the channelization code, the format of $N_{OFF1}=2\times(t-COi)$ mod 10 is selected as the slot format and these are respectively set. As a result, the information set as illustrated in FIG. 13 is reported to the Node-B 2.

S8: This step is the case in which FDP (c, t)=1 at step S6. The channelization code #c has already been used at the timing t and hence the next channelization code #(c+1) is set.

S9: Whether the channelization code identification number which has been updated at step S8 exceeds the previously prepared maximum value of the channelization code is judged. In the case that the channelization code identification number does not exceed the maximum value (c<N), the process at step S5 is executed.

S10: This step is the case in which the channelization code identification number exceeds the previously prepared maximum value of the channelization code (c=N) by the judgment at step S9 and the next timing (s=s+1) is set.

S11: Whether the frequency of retrieving the slot formats s which has been updated at step S10 exceeds 10 indicative of the number of slot formats is judged. In the case it exceeds 10 (s=10), it comes to an end, while in the case that it does not exceed 10, the process at step S3 is executed in order to judge whether a channelization code which is not used at this timing exists.

Incidentally, in the case that the F-DPCH of the user #i is to be released, FDP (Ci, Ti) is set to "0" as expressed by the following formula. In this condition, Ci is a channelization code identification number and Ti is a TPC output timing.

$$FDP(Ci, Ti)=0 \quad \text{(Formula 8)}$$

The above mentioned process is performed by executing a program stored in data storage medium such a memory or the like by arithmetic operation means such as a CPU or the like installed in the radio network control device (RNC) 1.

According to this embodiment, the reduction in feedback time for the up power control becomes possible by preferentially allocating the slot format which is the largest in the allowable range of the propagation delayed amount. That is, it becomes possible to select and allocate the down TPC bit timing, for example, the slot format of the F-DPCH which is optimum to reduce the reflected time of the power control. Specifically, whether there exists a free TPC bit at the optimum timing in the channelization codes secured in the F-DPCH is retrieved (loop processing from step S5 to step S9 in FIG. 14, FIG. 15). When there is no free TPC bit, the same processing is performed at a timing of a slot format in which the timing of the TPC bit is present 256 chips ahead (the loop processing from step S3 to step S11 in FIG. 14, FIG. 15). Owing to this, it becomes possible to select and allocate the slot format of the F-DPCH in which the reflected time of the power control is reduced.

Second Embodiment

In some cases, the propagation delayed amount fluctuates due to movement of the radio terminal (UE) 5 or the like after the F-DPCH has been set. For example, it sometimes occurs that although the propagation delayed amount is large upon channel setting and hence a slot format in which the up power control is performed by the 2-slot delay has been allocated, the propagation delayed amount is reduced during operation because the UE 5 comes closer to the radio base station (Node-B) 2.

In this embodiment, a slot format determining process to be again performed in the case that the UE 5 comes closer to the Node-B 2 and the delayed amount of propagation between the Node-B 2 and the UE 5 comes within a range in which the power control is possible by the 1-slot delay processing will be described.

Figure 16:
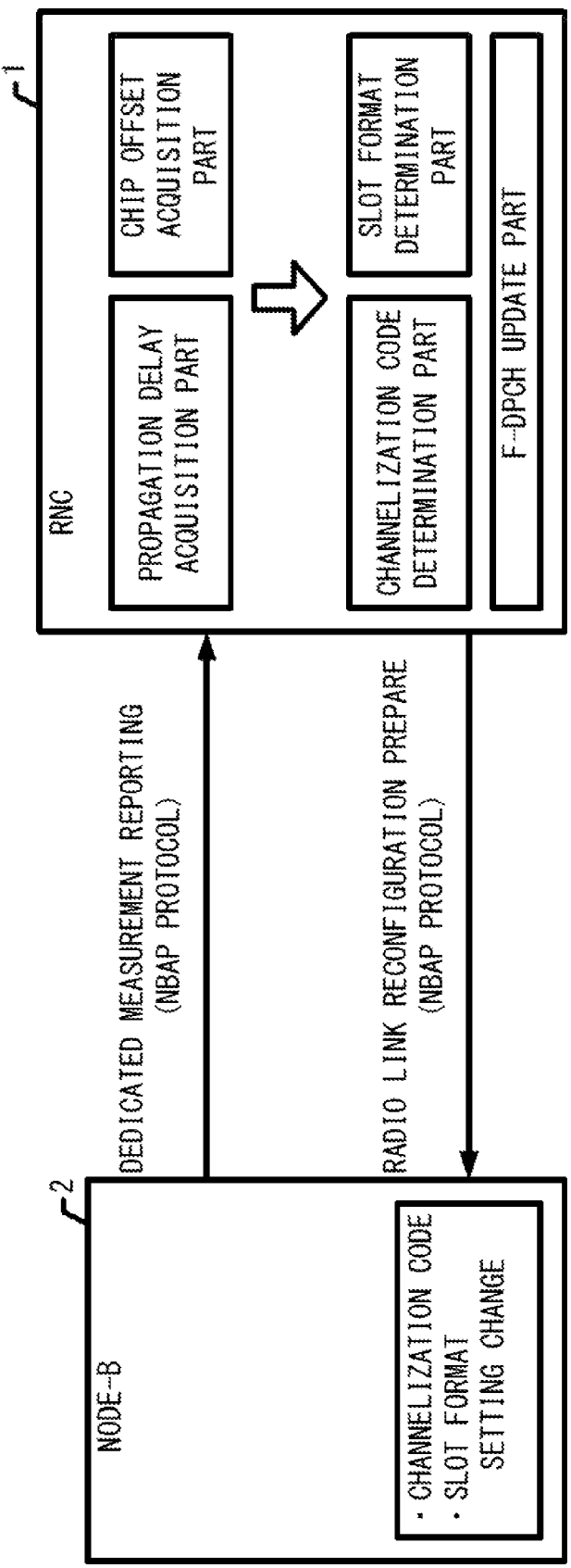
FIG. 16 is a diagram illustrating update of a channelization code and a slot format in the RNC.

FIG. 16 is a diagram illustrating update of a channelization code and a slot format in the RNC. The RNC 1 acquires a round trip time which is measured using the Node-B 2 and is reported by dedicated measurement reporting or the like in accordance with the NBAP protocol from the Node-B 2. The RNC 1 also acquires the chip offset value τi which is set using the Node-B 2, then selects a range under which the propagation delayed amount PDi comes in accordance with the acquired round trip time and obtains the corresponding Di from Formulae 7 to update them.

It is possible to acquire the chip offset value τi that the Node-B 2 recognizes to determine COi from Formula 4.

The channelization code and the slot format of the F-DPCH to be set are determined on the basis of these Di and COi. This determining method will be described later using FIG. 17, FIG. 18. The RNC 1 notifies the Node-B 2 of the updated channelization code and slot format with the radio link setup request signal upon setting of the discrete channel or the radio link reconfiguration prepare signal upon updating in accordance with the NBAP protocol.

Figure 17:
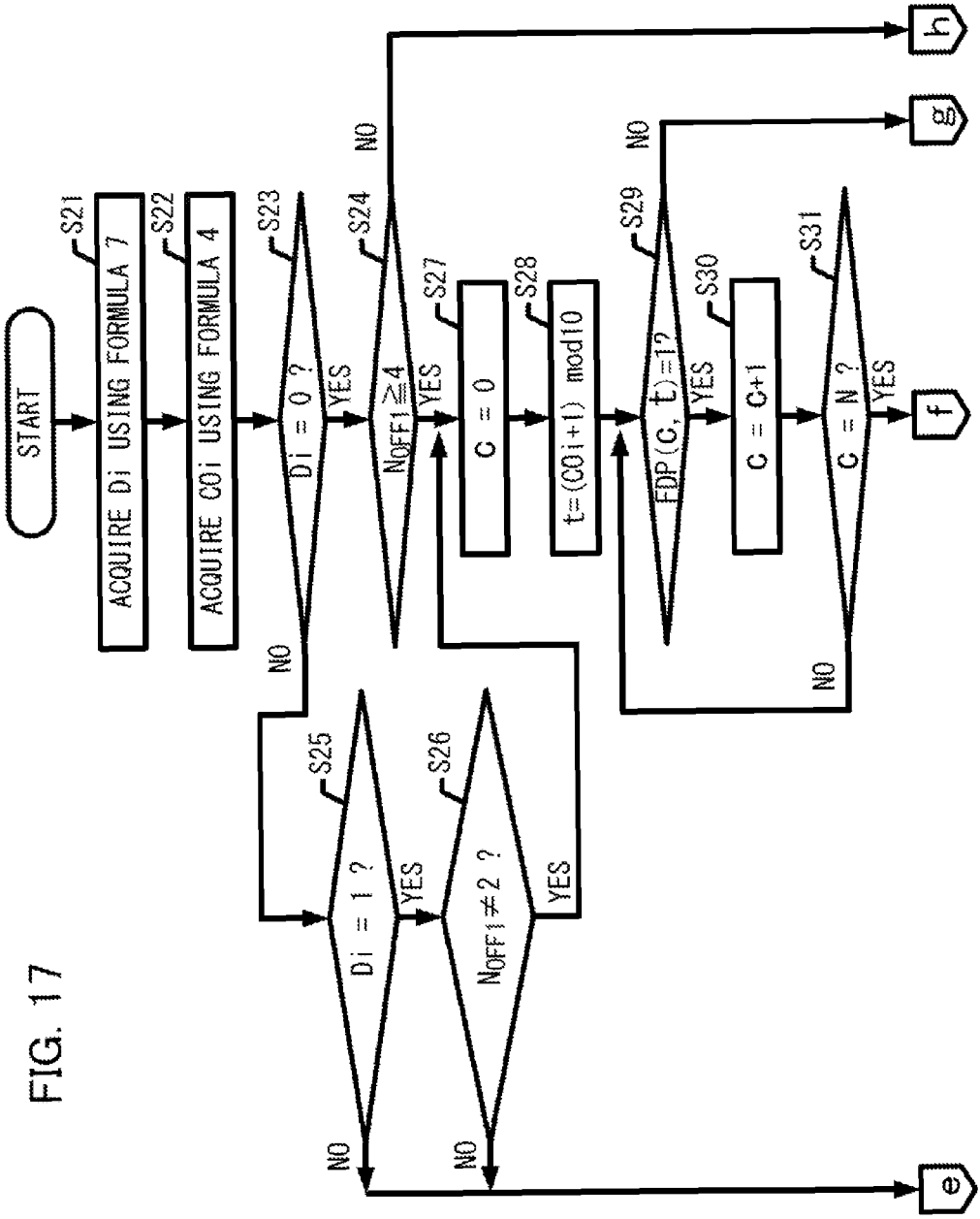
FIG. 17 is a flowchart illustrating an example of a method of updating the channelization code and the slot format when the F-DPCH is applied.
Figure 18:
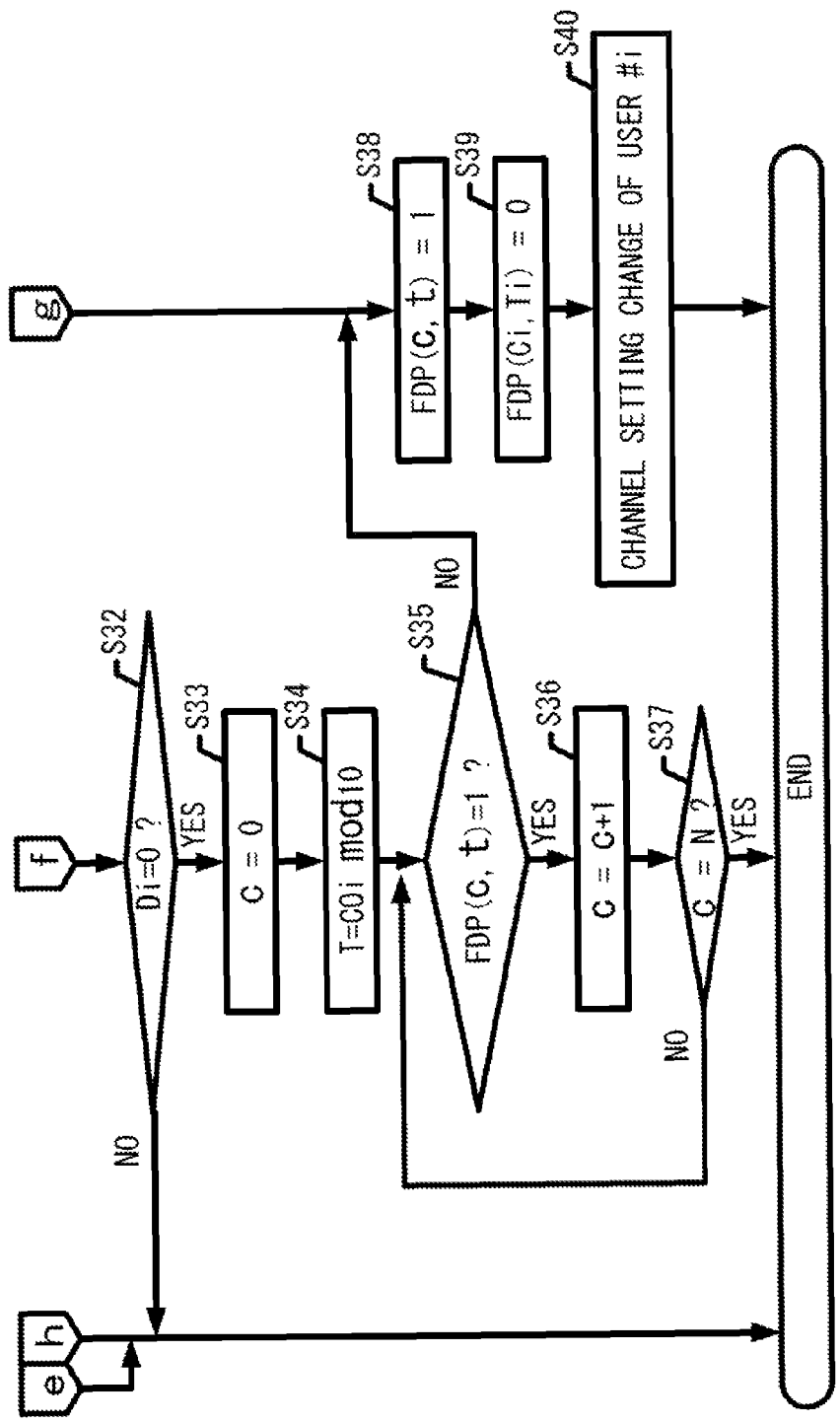
FIG. 18 is a flowchart illustrating an example of a method of updating the channelization code and the slot format when the F-DPCH is applied.

FIG. 17 and FIG. 18 are flowcharts illustrating an example of a method of updating the channelization code and the slot format when the F-DPCH is applied.

In the case that Di=0 as a result of fresh determination of Di by acquiring the measured value of the round trip time and any one of the slot formats #1 to #8 illustrated in FIG. 4 is being currently used ($N_{OFF1} \geqq 4$), whether the TPC timings of the slot format #9 and the slot format #0 are free is retrieved. In the case that Di=1 as a result of fresh determination of the Di and any one of the slot formats #1 to #9 is being currently used ($N_{OFF1} \neq 2$), whether the TPC output timing of the slot format #0 is free is retrieved. When there exists a free timing as a result of retrieval, change of setting to the corresponding channelization code and slot format is performed. When there exists no free timing, change of setting is not performed.

S21: A round trip time reported from the Node-B 2 is acquired and Di is derived from Formula 7.

S22: A chip offset value τi reported from the Node-B 2 is acquired and COi is derived from Formula 4. The order in which steps S21 and S22 are processed may be inverted. The derived Di and COi are stored in data storage medium such as a memory or the like.

S23: Whether Di=0 is judged. That is, whether Di obtained from the measured value of the reported round trip time is in a range in which the up power control is possible by the 1-slot delay is judged.

S24: This is the case in which Di=0 at step S23 and whether the currently set $N_{OFF1}$ is more than 4 is judged. That is, whether the currently used slot format is any one of #1 to #8 is judged. When NO as a result of judgment, the set $N_{OFF1}$ is 2 or 0, that is, the currently used slot format is #0 or #9, that is, setting better than the current setting is not expected by updating and hence the current status is maintained.

S25: This is the case in which Di≠0 at step S23 and whether Di=1 is judged at this step. That is, whether Di obtained from the measured value of the reported round trip time is in a range in which the up power control is possible by the 1-slot delay is judged. In the case that Di≠1 (NO) as a result of judgment, the currently measured round trip time indicates that the up power control is not possible by the 1-slot delay processing and hence the current status is maintained.

S26: This is the case in which Di=1 at step S2 and whether the currently set $N_{OFF1}$ is 2, that is, whether the currently used slot format is #0 is judged. When $N_{OFF1}$=2 (NO) as a result of judgment, setting better than the current setting is not expected by updating and hence the current status is maintained. When $N_{OFF1}$≠2 (YES) as a result of judgment, step S27 is executed.

S27: This is the case in which $N_{OFF1}$ is more than 4 at step S24 and the slot format which is being used is any one of #1 to #8. The power control by the currently set 2-slot delay processing may be changed to that by the 1-slot delay processing by updating the slot format to #0. Likewise, in the case that $N_{OFF1}$ is other than 2 at step S26, the slot format which is being used is any one of #1 to #9. It becomes possible to change the power control by the currently set 2-slot delay processing to that by the 1-slot delay processing by updating the slot format to #0. At this step, the parameter c=0 is set. Incidentally, the parameter c corresponds to the channelization code identification number.

S28: The remainder (mod 10) of the division of t=(COi+1) by 10 is obtained from COi derived at step S22. This step is the same as step S4 in the first embodiment and the TPC bit output timing in the slot format #0 is calculated.

S29: Whether the function FDP (c, t) constituted by the parameter c for identifying the channelization code and t obtained at step S28 is "1" is judged. That is, whether there currently exists an F-DPCH set to spread the TPC bit set at the timing t with the channelization code #c as illustrated in FIG. 12 is judged. "1" indicates its presence and "0" indicates its absence.

S30: This is the case in which FDP (c, t)=1 at step S29. The channelization code #c has already been used at the timing t and hence the next channelization code #c+1 is set.

S31: Whether the channelization code identification number which has been updated at step S30 exceeds the previously prepared maximum value of the channelization code is judged. In the case that it does not exceed the maximum value (c<N), the process at step S29 is executed.

S32: In the case that the channelization code identification number exceeds the previously prepared maximum value of the channelization code as a result of judgment at step S31 (c=N), whether Di=0 is judged. When Di=1 (NO) as a result of judgment, the up power control is not possible by the 1-slot delay processing and hence the current status is maintained. When Di=0 (YES), it becomes possible to change the power control by the currently set 2-slot delay processing to that by 1-slot delay processing by updating to the slot format #9 and hence the process at step S33 is executed.

S33: The parameter c=0 is set. Incidentally, the parameter c corresponds to the channelization code identification number.

S34: The remainder (mod 10) of the division of t=COi by 10 is obtained from COi derived at step S22. This step is the same as step S4 in the first embodiment and the TPC bit output timing in the slot format #9 is calculated.

S35: Whether the function FDP (c, t) constituted by the parameter c for identifying the channelization code and t obtained at step S34 is "1" is judged. That is, whether there currently exists an F-DPCH which is set to spread the TPC bit set at the timing t as illustrated in FIG. 12 with the channelization code #c is judged. "1" indicates its presence and "0" indicates its absence.

S36: This is the case in which FDP (c, t)=1 at step S35. The channelization code has been already used at the timing t, so that the next channelization code # (c+1) is set.

S37: Whether the channelization code identification number which has been updated at step S36 exceeds the previously prepared maximum value of the channelization code is judged. When it does not exceed the maximum value (c<N), the process at step S35 is executed.

S38: In the case that the FDP (c, t)=0 at the S29 or S35, the FDP (c, t) at each step is set to "1". That is, the FDP (c, t) at each step is not yet used and it is useful for the user concerned.

S39: The function FDP (Ci, Ti) indicative of whether the channelization code Ci and the timing Ti which have been used before changed are used is set to "0" to bring them into unused states, in association with such judgment that change of the slot format of the user #i concerned is to be performed.

S40: Channel setting of the user #i concerned is updated. That is, the code is updated to Code #c as the channelization code, the format is updated to a format of $N_{OFF1}$=2×(t−COi) mod 10 as the slot format and these are set. Incidentally, in this process, $N_{OFF1}$=0 or $N_{OFF1}$=2. Thus, information which has been updated as illustrated in FIG. 16 is reported to the Node-B.

The above mentioned processes are performed by executing the program stored in data storage medium such as a memory or the like by arithmetic operation means such as a CPU installed in the radio network control device (RNC) 1. In addition, data required for the processes is stored in data storage medium such as a memory or the like and data obtained by these processes is also stored in the data storage medium.

According to this embodiment, in the case that since the propagation delayed amount was large when the slot format of the F-DPCH has been set, a slot format for performing the up power control by the 2-slot delay processing is allocated and then the propagation delayed amount is reduced because the radio terminal 5 comes closer to the radio base station 2 while it is being operated and enters a range in which the power control by the 1-slot delay processing becomes possible, a process to determine again the slot format is performed, by which channel setting is updated. Thus, it becomes possible to update the slot format of the F-DPCH so as to reduce the reflected time of the power control.

In the above mentioned embodiment, a slot format changing process for switching the 2-slot delay processing to the 1-slot delay processing of the up power control because the propagation delayed amount is reduced owing to movement of the radio terminal 5 in a direction in which it approaches the radio base station 2 has been described. Contrary to the above, it sometimes occurs that the propagation delayed time is increased as the radio terminal 5 moves in a direction away from the radio base station 2. In this case, at first, the up power control by the 2-slot delay has been performed. However, such a situation is assumed that in the currently set slot format, the propagation delayed amount is increased and exceeds the range of the propagation delayed amount expressed in Formulae 3 and it is switched to 3-slot delay processing. Therefore, a process of changing to an optimum slot format may be performed as in the case in the above embodiment. That is, in the case that the up power control is to be performed by the 3-slot delay processing due to an increase in the propagation delayed amount, a process of selecting a slot format which allows the up power control by the 2-slot delay processing from the conditions in Formulae 3 and setting again the format is effective also for the propagation delayed amount which has been increased.

Third Embodiment

In the first and second embodiments, examples in which the slot format of the F-DPCH is set and updated have been described. A case in which there is no free slot format of a timing which is optimum to minimize the reflected time of power control due to setting statuses of other users in the same cell upon setting and updating of a slot format may be assumed.

In this embodiment, an example in which in the case that when an F-DPCH is set for a user concerned and is being operated, an optimum timing of a TPC bit becomes free because the F-DPCH of another user has been released or the slot format of the F-DPCH of another user has been changed, a process of determining the slot format of the user concerned is performed to update channel setting will be described.

In FIG. 14, FIG. 15 of the first embodiment or FIG. 17, FIG. 18 of the second embodiment, a case in which the reflected time of the up power control cannot be minimized due to the absence of a free slot format of an optimum timing is assumed. The case corresponds to a case in which a slot format from which the 2-slot delay processing results when $Di \leqq 1$ has been set or a case in which a slot format from which the 3-slot delay processing results when $Di \geqq 3$ has been set.

Here, when a slot format of the F-DPCH of the user #i is freshly set or updating of setting is performed, a user who applies to any one of the above mentioned conditions is held in a standby state for an optimum timing (for example, it is stored in a memory as standby user hold information).

In the case that the F-DPCH of another user whose TPC output timing is t has been released, updating of the slot format and the channelization code is performed so as to allocate the FDP(c, t) which has been free to the user who is in a standby state for the timing t. The process relating to updating corresponds to the process described in the second embodiment.

That is, for example, in the case that any one of the slot formats #1 to #8 has been allocated to the user of Di=0, a standby state for the timings of t=COi mod 10 and t=(COi+1) mod 10 is taken. In the case that any one of the slot formats #1 to #9 has been allocated to the user of Di=1, a standby state for the timing of t=(COi+1) mod 10 is taken. That is, a standby state for updating to a slot format in which the up power control by the 1-slot delay processing becomes possible is taken for the user of $Di \leqq 1$.

In the case that any one of the slot formats #1 to #7 has been allocated to the user of Di=9, a standby state for the timings of t=COi mod 10, t=(COi+1) mod 10 and t=(COi+9) is taken. That is, a standby state for updating to a slot format in which the up power control by the 2-slot delay processing becomes possible is taken for the user of $Di \geqq 3$.

Incidentally, in the case that there exist a plurality of users who are in standby states for a timing t, a user whose slot format and channelization code are updated may be determined by using priority of user data, standby elapsed time and the like as conditions.

The above mentioned processes are performed by executing the program stored in data storage medium such as a memory or the like by arithmetic operation means such as a CPU installed in the radio network control device (RNC) 1. In addition, data required for the processes is stored in data storage medium such as a memory or the like and data obtained by these processes is also stored in the data storage medium.

According to this embodiment, in the case that the optimum timing of the TPC bit has become free owing to releasing of the F-DPCH owned by another user, channel setting may be updated by performing a process of determining a slot format of a user concerned.

According to these embodiments, a channel identification spread code and time slot information is determined on the basis of a round trip time indicative of a time taken for a round trip of data transmission from a base station device to a radio terminal and vice versa and an offset value indicative of a delay of a timing at which the base station device transmits the TPC bit to the radio terminal from a reference timing, so that the feedback time of the transmit power control of the radio terminal is reduced.

As a result, it becomes possible to improve up data transfer performance of a high-speed mobile terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio network controller being operable to transmit a channel identification spread code and time slot information to a base station device transmitting information of transmitting power control used to control a radio transmitting power of a radio terminal, the radio network controller comprising:

a processor configured to acquire a measurement value of a round-trip time when a signal shuttles between the base station device and the radio terminal;

a processor configured to acquire an offset value indicating a delay of a timing at which the base station device transmits the information of transmitting power control to the radio terminal, from a reference timing;

a processor configured to determine the channel identification spread code transmitted to the base station device based on the measurement value of the round-trip time and the offset value acquired; and a processor configured to determine the time slot information transmitted to the base station device based on the measurement value of the round-trip time and the offset value acquired.

2. The radio network controller according to claim 1, wherein the time slot information is used for time-division multiplexing the information of transmitting power control of each channel corresponding to a plurality of the radio terminals, the information of transmitting power control being spread by using a same spread code.

3. A transmitting power control method being operable to set a time slot used to transmit a channel identification spread code and time slot information in a radio network controller transmitting the channel identification spread code and the time slot information to a base station device transmitting information of transmitting power control used to control a radio transmitting power of a radio terminal, the transmitting power control method comprising the steps of:

acquiring a measurement value of a round-trip time when a signal transmitted from the base station device shuttles between the base station device and the radio terminal;

acquiring an offset value indicating a delay of a timing at which the base station device transmits the information of transmitting power control to the radio terminal, from a reference timing;

searching a first time slot unused in case of a combination with a first time slot information determined by the acquired offset value and a prepared channel identification spread code;

in case that the first time slot unused is unsearchable, searching a second time slot unused in case of a combination with a second time slot information that an allowable range of a propagation delayed amount between the base station device and the radio terminal is smaller than the first time slot information and the prepared channel identification spread code; and controlling to transmit the channel identification spread code and the time slot information to the base station device by searching the unused time slot in such a way as to execute a processing of the searching the second time slot up to a predetermined number of the time slot.

4. The transmitting power control method according to claim 3, wherein the predetermined number of the time slot is a multiple number of time-division multiplexing the information of transmitting power control of each channel corresponding to a plurality of the radio terminals, the information of transmitting power control being spread by using a same spread code.

5. The transmitting power control method according to claim 3, wherein the steps are executed in case of the radio terminal being located in an area managed by the radio network controller.

6. The transmitting power control method according to claim 3, wherein the steps are executed in case that the measurement value of the round-trip time to the radio terminal is beyond a predetermined scope, the information of transmitting power control corresponding to the radio terminal being set in the time slot.

7. The transmitting power control method according to claim 6, wherein the steps are executed in case that a radio terminal waiting for being set the information of transmitting power control in the time slot exists since the unused time slot is not recognized, and in case of finding the unused time slot by one of the time slot of the radio terminal becoming to unused and the time slot of the radio terminal being changed to other time slot, the information of transmitting power control corresponding to the radio terminal being set in the time slot.

8. A radio communication system comprising a base station device and a radio network controller being operable to transmit a channel identification spread code and time slot information to the base station device transmitting information of transmitting power control used to control a radio transmitting power of a radio terminal, the radio communication system comprising:

the base station device for measuring a round-trip time when a signal shuttles between the base station device and the radio terminal; and the radio network controller for acquiring the measurement value of the round-trip time and an offset value indicating a delay of a timing at which the base station device transmits the information of transmitting power control to the radio terminal, from a reference timing;

in case that the first time slot unused is unsearchable, searching a first time slot unused in case of a combination with a first time slot information determined by the acquired offset value and a prepared channel identification spread code;

searching a second time slot unused in case of a combination with a second time slot information that an allowable range of a propagation delayed amount between the base station device and the radio terminal is smaller than the first time slot information and the prepared channel identification spread code; and controlling to transmit the channel identification spread code and the time slot information to the base station device by searching the unused time slot in such a way as to execute a processing of the searching the second time slot up to a predetermined number of the time slot.

* * * * *